United States Patent Office 3,501,263
Patented Mar. 17, 1970

3,501,263
PROCESS FOR THE MANUFACTURE OF
GERMANIUM-(II)-PHOSPHITE
Peter Schweizer, Konigsbrunn, near Augsburg, Germany, assignor to Farbwerke Hoechst Aktiengesellschaft vormals Meister Lucius & Bruning, Frankfurt am Main, Germany, a corporation of Germany
No Drawing. Filed Nov. 8, 1967, Ser. No. 681,570
Claims priority, application Germany, Nov. 11, 1966, F 50,648
Int. Cl. C01b 25/26; C01g 17/00
U.S. Cl. 23—23
3 Claims

ABSTRACT OF THE DISCLOSURE

Germanium - (II) - phosphite is obtained by reacting germanium-(IV)-oxide, hypophosphorous acid and phosphorous acid in a molar ratio of 1:1: at most 1 in an aqueous solution containing 200 to 800 milliliters of water for each mole of germanium-(IV)-oxide at a temperature of from 50 to 100° C. After separation of the crystalline germanium - (II) - phosphite precipitate the mother liquor is used for a new reaction and the originally used amount of germanium-(IV)-oxide and hypophosphorous are added.

---

It has been proposed to produce germanium-(II)-phosphite by reduction of germanium-(IV)-oxide with hypophosphorous acid in the presence of a large excess of phosphorous acid. In this process freshly precipitated germanium-(IV)-oxide, hypophosphorous acid and phosphorous acid are dissolved in water in a molar ratio of 1:1: at least 2, the solution is freed from insoluble constituents by filtration and heated to boil. A crystalline precipitate of germanium-(II)-phosphite forms which is separated from the aqueous phase.

The yields of the known process are, however, unsatisfactory, the process is complicated and large amounts of expensive starting substances are required. The necessary dissolution and precipitation of technical grade germanium-(IV)-oxide and the separation by filtration of the proportion thereof that is insoluble in the aqueous solution of phosphorous and hypophosphorous acid involve a considerable loss of germanium-(IV)-oxide before the beginning of the proper reaction. Moreover, the large excess of phosphorous acid used for an optimum dissolution of the freshly precipitated germanium-(IV)-oxide is uneconomical.

It has now been found that germanium-(II)-phosphite can be produced in an approximately theoretical yield and while saving considerable amounts of phosphorous acid and germanium-(IV)-oxide by heating technical grade germanium-(IV)-oxide, hypophorous acid and phosphorous acid in a molar ratio 1:1: at most 1 at a temperature in the range of from 50 to 100° C., preferably 70 to 95° C. in 200 to 800 milliliters, preferably 300 to 500 milliliters, of water for each mole of germanium-(IV)-oxide until the reaction is terminated, separating the crystalline precipitate of germanium-(II)-phosphite, repeating the reaction several times in the mother liquor, and adding for each new reaction the original amount of germanium-(IV)-oxide and hypophosphorus acid.

After having carried out the reaction four times in the same mother liquor, the total yield of germanium-(II)-phosphite, calculated on the total amount of germanium-(IV)-oxide and hypophosphorous acid used amounts to 98% of the theory. The single addition of phosphorous acid in an amount that is only one half of the amount used in the known process and the fact that the reaction is carried out several times in the same aqueous solution of phosphorous acid save important amounts of phosphorous acid.

To carry out the process according to the invention technical grade amorphous or microcrystalline germanium-(IV)-oxide can be used. It is not necessary to use freshly precipitated germanium - (IV) - oxide as in the known process, whereby the high costs to produce a soluble modification, inter alia owing to the high substance losses, are avoided. Germanium-(IV)-oxide is advantageously introduced, while vigorously stirring, into the aqueous solution of the acids of phosphorous, preferably at the reaction temperature, whereby it is partially dissolved and partially remains in suspension. A separation by filtration of undissolved matter is dispensed with. It has been found that undissolved germanium-(IV)-oxide dissolved in the same measure as the formed germanium-(II)-phosphite separates in the form of a microcrystalline precipitate.

It has also been found that germanium-(II)-phosphite can be produced by the process of the invention without the use of phosphorous acid if a slight contamination of the colorless germanium-(II)-phosphite with brown hydrated germanium-(II)-oxide is tolerated. In order to prevent the latter from being formed it is advantageous to add small amounts of phosphorous acid to the reaction medium, preferably ½ to 1 mole for each mole of germanium-(IV)-oxide. The phosphorous acid is not consumed in the reaction and need not be replenished or renewed after the reaction has repeatedly been carried out in the same mother liquor.

It has proved advantageous to add to the solution or suspension of the reactants at most 800, preferably 300 to 500 milliliters of water for each mole of germanium-(IV)-oxide because with a higher degree of dilution a longer reaction time is required. The process of the invention need not be carried out with the exclusion of air or in an inert gas.

At a temperature of 100° C. the reaction is terminated after 2 hours at the latest with a molar ratio of germanium-(IV)-oxide to hypophosphorous acid to phosphorous acid of 1:1:1 and after 4 hours at the latest with a molar ratio of 1:1:½. When the reaction temperatures are lower the reaction time required is also longer. At a temperature of 70° C., for example, and with a molar ratio of 1:1:1 it is 4 hours.

When the reaction is terminated the precipitate of germanium-(II)-phosphite is separated from the mother liquor in known manner by filtration or centrifugation. The mother liquor is reintroduced into the reaction vessel. After the addition of the originally used amount of germanium-(IV)-oxide and hypophosphorous acid the next reaction takes place.

The hitherto necessary working up of the mother liquor to recover the germanium compounds contained therein and the working up of the recovered germanium compounds to germanium-(IV)-oxide are no longer required. The fact that the mother liquor is repeatedly used as reaction medium saves phosphorous acid, which is only added once, and involves an excellent yield of germanium-(II)-phosphite.

The process according to the invention can be carried out continuously.

The following example serves to illustrate the invention but it is not intended to limit it thereto.

Example

In a round glass flask having a capacity of 250 cc. or a corresponding cylinder made of stainless steel 22.1 grams (0.335 mole) of hypophosphorous acid and 26.2 grams (0.320 mole) of phosphorous acid were dissolved in 175 milliliters of water. The solution was heated to 95° C. and 34.9 grams (0.335 mole) of amorphous germanium dioxide were slowly introduced while vigorously stirring. Stirring was continued for 90 minutes while the content of the flask was maintained at 95° C. After cooling, the germanium-(II)-phosphite which separated in the form of a white crystalline precipitate was filtered off. The compound was obtained in a well filterable form, it was washed with a small amount of water and dried, preferably at 50 to 100° C. under a pressure of 10 mm. of mercury. The yield amounted to 45.35 grams.

The mother liquor of the germanium-(II)-phosphite was reintroduced into the reaction vessel together with 22.1 grams of hypophosphorous acid. At a temperature of the solution of 95° C., 34.9 grams of amorphous germanium dioxide were introduced as in the first reaction, while vigorously stirring. The reaction mixture was maintained for 90 minutes at 95° C., whereupon the newly formed germanium-(II)-phosphite was filtered off. It was washed and dried as described above. The yield amounted to 50.55 grams.

The mother liquor was again introduced into the reaction vessel and the reaction was performed as set forth above. The yield of the third repetition of the reaction amounted to 52.0 grams. The yield of the fourth repetition of the reaction was 49.65 grams. The reaction can be frequently repeated.

After carrying out the reaction four times the total yield of germanium-(II)-phosphite amounted to 197.55 grams, corresponding to 98.0% of the theory, calculated on the total amount of germanium dioxide and hypophosphorous acid used.

Nowadays germanium compounds are frequently used in industry, for example, as catalysts for the production of polyethylene terephthalate.

What is claimed is:

1. A process for the manufacture of germanium-(II)-phosphite which comprises reacting germanium-(IV)-oxide, hypophosphorous acid and phosphorous acid in a molar ratio of 1:1: at most 1 in 200 to 800 milliliters of water for each mole of germanium-(IV)-oxide at a temperature in the range of from 50 to 100° C., separating the resulting crystalline precipitate of germanium-(II)-phosphite from the resulting mother liquor, adding to the mother liquor additional germanium-(IV)-oxide and hypophosphorous acid in amounts sufficient to maintain the molar ratio of germanium-(IV)-oxide, hypophosphorous acid and phosphorous acid at 1:1 at most 1 and the amount of water at 200 to 800 milliliters for each mole of germanium-(IV)-oxide, maintaining the resulting mixture at a temperature in the range of from 50 to 100° C. and separating the resulting crystalline precipitate of germanium-(II)-phosphite from the resulting mother liquor.

2. The process of claim 1, wherein the reaction temperature is in the range of from 70 to 95° C.

3. The process of claim 1, wherein the reaction is carried out in the presence of 300 to 500 milliliters of water for each mole of germanium-(IV)-oxide.

References Cited

Everest: Journal of the Chemical Society (London), 1953, pp. 4117–4120.

HERBERT T. CARTER, Primary Examiner

U.S. Cl. X.R.

23—105